United States Patent
Weinstein et al.

[11] Patent Number: 5,184,760
[45] Date of Patent: Feb. 9, 1993

[54] METERED SIDE DISPENSING CAP FOR TUBES

[75] Inventors: Jack Weinstein, Manchester Township, Ocean County; Kenneth P. Glynn, Rariton Township, Hunterdon County, both of N.J.

[73] Assignee: Primary Delivery Systems, Inc., Easton, Pa.

[21] Appl. No.: 775,036

[22] Filed: Oct. 11, 1991

[51] Int. Cl.⁵ .............................................. B65D 37/00
[52] U.S. Cl. .................................. 222/207; 222/209; 222/212; 222/380; 222/425
[58] Field of Search ............... 222/205, 206, 207, 209, 222/212, 213, 380, 424.5, 425, 522

[56] References Cited
U.S. PATENT DOCUMENTS

| | | | |
|---|---|---|---|
| 1,926,367 | 9/1933 | Booth | 222/320 |
| 2,205,082 | 6/1940 | Callaghan et al. | 222/320 |
| 2,591,455 | 4/1952 | marshall et al. | 222/424.5 |
| 3,089,623 | 5/1963 | Padzieski | 222/205 |
| 3,785,532 | 1/1974 | Cooprider | 222/207 |
| 4,077,547 | 3/1978 | Donoghue | 222/207 |
| 4,364,492 | 12/1982 | Kong | 222/205 |
| 4,376,495 | 3/1983 | Spatz | 222/46 |
| 4,518,105 | 5/1985 | Kuckens | 222/207 |
| 4,872,596 | 10/1989 | Corsette | 222/380 |
| 4,875,603 | 10/1989 | Weinstein | 222/205 |
| 4,890,773 | 1/1990 | Corsette | 222/380 |
| 5,110,051 | 5/1992 | Bennett | 222/212 |

Primary Examiner—Andres Kashnikow
Assistant Examiner—Joseph A. Kaufman
Attorney, Agent, or Firm—Kenneth P. Glynn

[57] ABSTRACT

The present invention is directed to a metered side dispensing cap system for containers such as tubes and the like. It includes a chamber unit having an inlet opening in the bottom for flow of a material from a squeezable container into the chamber. The chamber unit has an outlet opening on a sidewall located near the bottom for dispensing material from the chamber in a metered amount. A one-way valve located in the inlet opening on the bottom of the chamber unit permits flow of material through that opening and prevents backflow of material. A piston mechanism moves upwardly and downwardly within the chamber. The piston mechanism is capable of upward movement by material entering the chamber unit when a squeezable container is squeezed and material enters the chamber unit through its inlet opening. The piston is capable of downward movement when its wide top is pushed downward, so as to dispense material through the sidewall outlet opening of the chamber unit. The system is attachable to an open neck of a squeezable container.

20 Claims, 3 Drawing Sheets

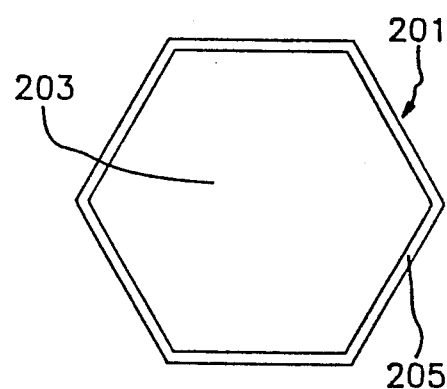
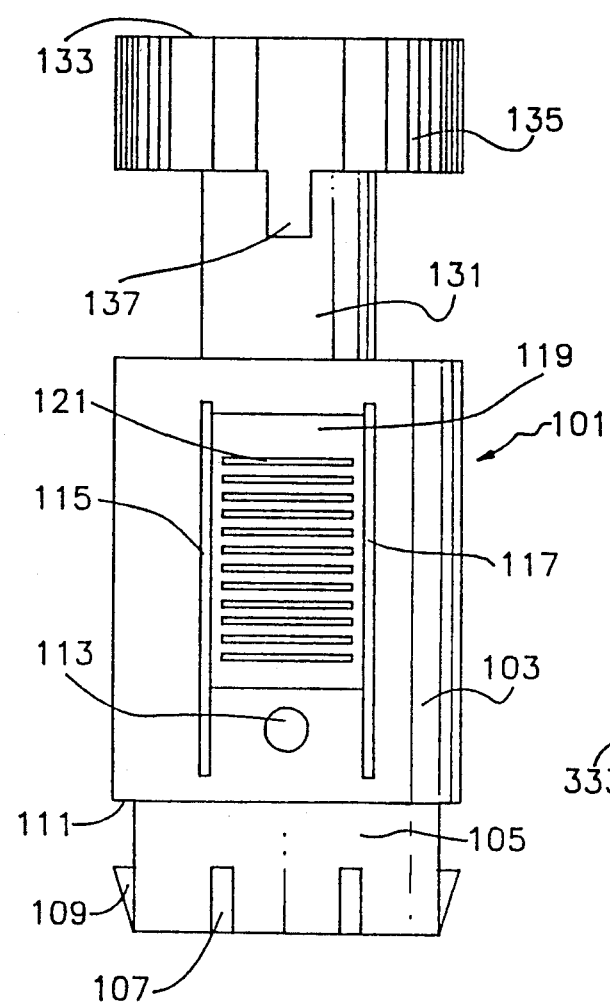
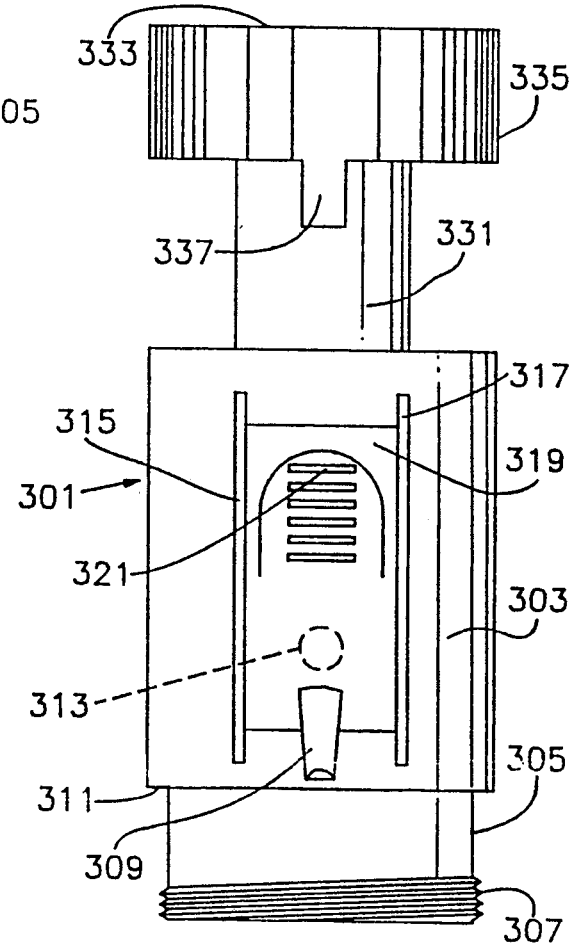

METERED SIDE DISPENSING CAP FOR TUBES

BACKGROUND OF THE INVENTION

1. Field of the Invention

The present invention relates to an easy-to-use metered dispensing cap for tubes and other types of containers. In particular, this invention is directed to a cap system which permits metered amounts of material to be repeatedly dispensed from the side of the cap as desired. By squeezing the container, the metered cap is filled as it is pushed upward; by being opened at the side and pushed downward, the cap dispenses the material, closes the side opening and is repositioned for the next usage.

2. Prior Art Statement

Numerous patents describe various types of dispensing caps and the industry is inundated with various designs which are sometimes complicated in operation and/or complex to manufacture. The art goes back decades, and the following patents describe different types of dispensing caps and systems that are exemplary:

Early United States Patents were directed to metering systems involving designs which typically utilize the full length of a cylindrical chamber to create a volume for the dispensing of a liquid or a semiliquid material. U.S. Pat. Nos. 1,926,367 and 2,205,082 illustrate these types of early dispensing containers. Dispensing systems involving chambers or traps at the tops of the containers were subsequently developed and these are exemplified by U.S. Pat. Nos. 2,591,455 and 3,089,623.

More recent United States Patents describe measuring and dispensing caps which involve squeeze bottles and/or pump mechanisms for dispensing of liquid and semiliquid materials. Thus, U.S. Pat. Nos. 4,077,547; 4,364,492; 4,376,495 and 4,518,105 described various types of dispensing systems using trap chambers with squeezable bottles and/or pump mechanisms.

U.S. Pat. No. 4,875,603, issued to the inventor herein, describes a metered dispensing cap for tubes wherein the container is squeezed to fill a meter element or chamber and a cap is removed and the top element depressed to dispense a metered amount of fluid. Unlike the present invention, however, this prior art device dispenses from the top and requires that a cap be screwed off to dispense and screwed back on to permit resetting for refilling the chamber and redispensing.

Notwithstanding formidable prior art in the metered dispensing field, none of the prior art systems describe a simple metered chamber mechanism such as is described in the present invention wherein squeezing the container to fill, lifting a collar to open and pressing the top for dispensing results in a simple metered dispensing of a fluid and a complete closing and resetting of the mechanism.

SUMMARY OF THE INVENTION

The present invention is directed to a metered side dispensing cap system for containers such as tubes and the like. It includes a chamber unit having an inside and an outside, a bottom, sidewalls and a top and having an inlet opening in the bottom for flow of a material from a squeezable container into the chamber. The chamber unit has an outlet opening on a sidewall located near the bottom for dispensing material from the chamber in a metered amount. The chamber unit has an opening at the top for receiving a piston rod. A one-way valve located in the inlet opening on the bottom of the chamber unit permits flow of material from a squeezable container through that opening and prevents backflow of material back into the squeezable container. A gate is movably attached to the outside of the chamber unit near the outlet opening so as to be movable vertically to an upward position and to a downward position. In the upward position, the gate does not close off the outlet opening and, in the downward position, the gate closes off the outlet opening. A piston mechanism moves upwardly and downwardly within the chamber and, in its upward position, extends substantially beyond the top of the chamber through the piston rod opening in the top of the chamber. The piston mechanism includes a wide top, a rod and a piston head. The piston head is movably located within the chamber unit and has the same cross-sectional area as the inside of the chamber unit. The rod runs from the piston head through the opening in the top of the chamber unit top. The piston mechanism is capable of upward movement by material entering the chamber unit when a squeezable container is squeezed and material enters the chamber unit through its inlet opening. The piston is capable of downward movement when its wide top is pushed downward, so as to dispense material through the sidewall outlet opening of the chamber unit. The piston mechanism has its wide top extending downward on the outside of the chamber unit so as to contact the gate and move the gate from its upward position to its downward position when the wide top is pushed downward. The system is attachable to an open neck of a squeezable container.

BRIEF SUMMARY OF THE DRAWINGS

The present invention and further particulars will be more fully understood in the following description which is made with reference to preferred embodiments shown in the drawings appended hereto, wherein:

FIG. 3 shows a top view of a metered dispensing cap system of the present invention with a hexagonal cross-section;

FIG. 4 shows a front view of a third embodiment of the present invention wherein the chamber unit has an alternative attachment means; and, FIG. 5 illustrates a frontal view of another present invention metered side dispensing cap system.

DETAILED DESCRIPTION OF THE PRESENT INVENTION

Figure 1:
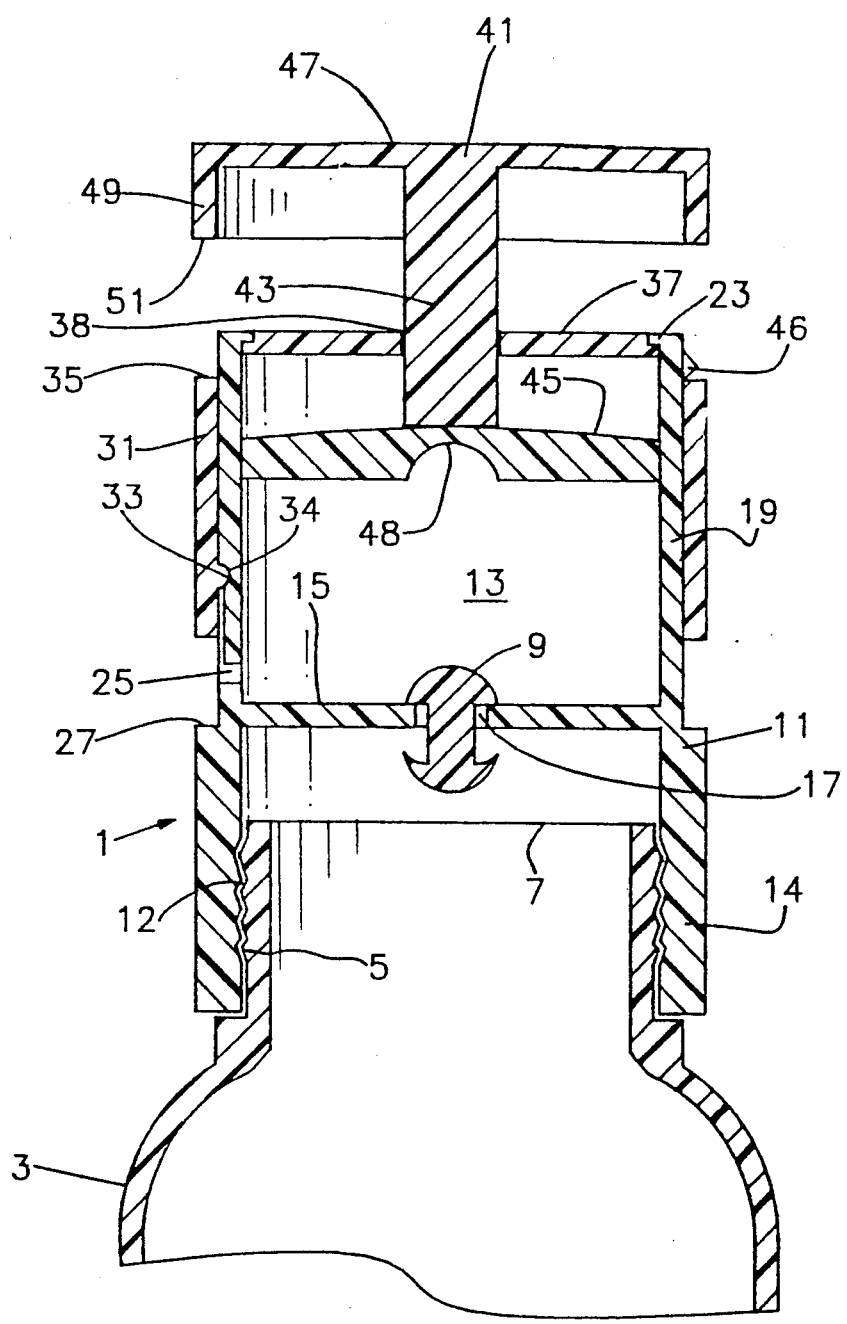
FIG. 1 illustrates a side, cut view of a squeezable container with the metered side dispensing cap system and shows other features of a preferred embodiment of the present invention.

Referring now to the drawings, FIG. 1 shows a side, cut view of a container 3 which includes a present invention metered dispensing cap system 1. Container 3 includes open neck 7 with threads 5. Chamber unit 11 has a sidewall 19 with outlet opening 25, an opening top 23 and a bottom with inlet opening 17. Inserted into inlet opening 17 is one-way valve 9 which permits the flow of material from container 3 into open area 13 of chamber unit 11 but prevents its flow from chamber unit 11 back into container 3. A plug cap 37 has opening 38 to accommodate piston rod 43 as shown. The plug cap 37 may be replaced by a smaller opening in the top 23 of chamber unit 11. Piston rod 43 has a wide top 47 and a flange 49 extending downwardly therefrom terminating at edge 51. This piston mechanism 41 moves vertically, upwardly and downwardly so that piston 45 may traverse nearly the full height of volume 13 within chamber. Gate 31 (in this case an annular collar) is movable vertically and has an upward position terminated by stop 46 and a downward position terminated by ledge 27. When gate 31 is in its upward position, protrusion 33 of gate 31 nests in indentation 34 of sidewall 19, and when gate 31 is in its downward position, protrusion 33 nests in outlet opening 25.

The metered side dispensing cap system 1 in FIG. 1 is operated as follows:

Container 3 is filled with a paste, cream, gel or other material which is generally dispensable from a squeeze bottle. System 1 is screwed onto threads 5 of open neck 7 with gate 31 in the downward position and piston mechanism 41 in the downward position. A user squeezes container 3 and the material therein pushes up one way valve 9 and pushes up piston mechanism 41 to fill volume 13. When the squeezing is released, pull back closes valve 9 downwardly, or gravity may do so, and material within volume 13 will not flow back into container 3. Before the user pushes down on piston mechanism 41, gate 31 must be moved upward to expose outlet orifice 25 for dispensing. As the user pushes down on piston mechanism 41, piston 45 pushes on the material and it flows out of outlet orifice 25 for a metered amount of dispensed material. Advantageously, when the user pushes piston mechanism nearly all the way down, edge 51 of top 47 engages gate ledge 35 and, as the movement continues, gate 31 is moved to its downward position and the outlet opening 25 is shut. At this point, the system has been emptied, is closed and has been automatically reset for the next use. No cap need be put on to prevent accidental dispensing and fewer steps than prior art devices are needed to use the present invention cap system.

The functioning of the chamber fill, piston mechanism, gate movement and chamber dispensing described above is similar to the overall functioning of the other devices herein and need not be repeated.

Figure 2:
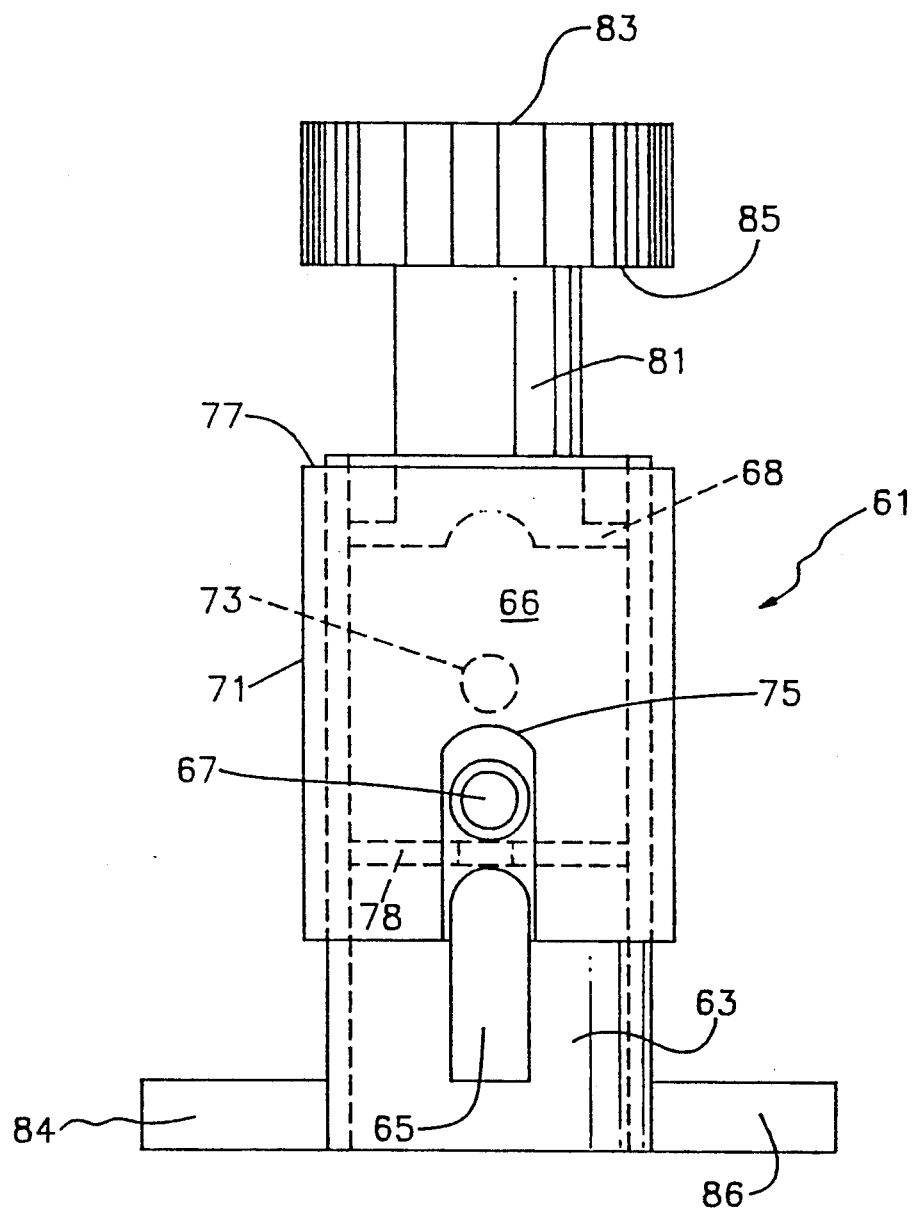
FIG. 2 shows a front view of an alternative embodiment of the present invention metered side dispensing cap system including part of a container.

Referring now to FIG. 2, there is shown a front view of an alternative embodiment metered side dispensing cap system 61. The Figure has been simplified to illustrate new features over FIG. 1 and a one way valve and container attachment means, all described above, are not shown to give more clarity to the new features. Chamber 66 includes outlet opening 67 and has a downwardly extending section 63 and a protrusion 65 thereon, as shown. Piston mechanism 83 includes top 85, shaft 81 and piston 68. Top 85 will engage ledge 77 of gate 71 in a fashion similar to that described with respect to the FIG. 1 embodiment. However, here, gate 71 has cut-out 75 which has a complementary configuration to protrusion 65, as shown. This cut-out 75 performs three diverse functions: it keeps gate 71 from rotating or misaligning by guiding the gate 71 when it is moved to its upward and downward positions; it opens outlet opening 67 when in the upward position and closes outlet opening 67 when in the downward position; and, in conjunction with protrusion 65, functions as a stop.

As can be seen, outlet opening 67 is located near floor 78 of chamber 66 for maximum dispensing of a metered amount of material. Also, circle 73 represents aligned indentation and protrusion on the chamber 66 and on the inside of gate 71 respectively to hold gate in its upward position until piston top 85 pushes down on gate 71. In its downward position, the gate has its protrusion aligned with and popped into outlet opening 67 for enhanced sealing.

Horizontal extensions 84 and 86 are for enhanced gripping and enables the user to hold the cap system somewhat like a hypodermic needle but with side dispensing.

FIG. 3 shows a top view of an alternative present invention cap system 201, to merely illustrate an alternative configuration to a round cross-section. Thus, piston mechanism 205 seats atop a gate of identical outer dimensions which surrounds chamber 203.

FIG. 4 shows a front view of a third embodiment of a present invention metered side dispensing cap system 101. Chamber 103 contains an identical internal flow mechanism identical to what is shown in FIG. 1. Extended base 105 has a ledge 111 and snap-in removal stops typified by stops 107 and 109. Outlet opening 113 is located just above the bottom of the chamber volume (not shown). Preformed guiderails 115 and 117 hold gate 119 in place. Gate 119 has an upward position, as shown and a downward position which would place it at the bottom of guiderails 115 and 117 so as to shut off outlet opening 113. Grid 121 makes it easier for the user to push gate 119 upwardly as when in use. Piston mechanism 133 has top 135 with downwardly extended portion 137. When piston mechanism 133 is pushed down, shaft 131 connected to a piston (not shown) moves dispensing material to outlet opening 113 as protrusion 137 eventually engages and shuts gate 119.

FIG. 5 illustrates yet another present invention metered side dispensing cap system 301. Here, chamber unit 303 has a narrow lower portion 305 with threads 307 for screwing into a container with internal threading. Guiderails 315 and 317 are provided for gate 319. (Internals aspects, not shown, are similar to those shown for the system of FIG. 1 above.) Gate 319 includes finger notch 321 and nozzle 309 (with an orifice in gate 319 located behind the nozzle 309, not shown). Outlet opening 313 in chamber 303 is shut off when gate 319 is in the downward position, as shown. In this embodiment, as shown in FIG. 5, piston mechanism 333 with top 335, extension 337 and shaft 331, works in a manner like that described above for the earlier embodiments in FIGS. 1 and 4. When gate 319 is pushed upward by a user, nozzle 309 aligns with outlet opening 313. When piston mechanism 333 is pushed down, material is dispensed in a metered amount and extension 337 ultimately pushes down on gate 319, shutting off outlet opening 313 and resetting system 303 for reuse.

The present invention metered side dispensing cap system may be formed of plastics, glass, metal or any other workable material of construction. Likewise, the size and shape of the chamber, the inlet and the outlet openings, the means for attachment, tolerances and seals are within the skill of the artisan. Further, other variations should now be apparent in view of the above disclosure. For example, a gate may have a slanted closing path or may have an orifice for alignment, non-alignment with the outlet opening. The one way valve could be a spring or flap or other valve. The system could readily be modified to a dual dispensing system. Thus, while the above provides details of preferred embodiments, the present invention and the following claims should not be construed to be limited thereto.

What is claimed is:

1. A metered side dispensing cap system for attaching to squeezable containers, which comprises:
   (a) a chamber unit having an inside and an outside, a bottom, sidewalls and a top and having an inlet opening in said bottom for flow of a material from a squeezable container into said chamber, having an outlet opening on a sidewall located near said bottom for dispensing material from the chamber in a metered amount, having an opening at said top for receiving a piston rod and having means for attachment of said chamber unit to an open neck of a squeezable container;
   (b) a one-way valve located in said inlet opening on the bottom of said chamber unit, permitting flow of material from a squeezable container through said opening and preventing backflow of material back into said container; (c) a gate located on the outside of said chamber unit near said outlet opening movably attached thereto so as to be movable vertically to an upward position and to a downward position whereby, in said upward position, said outlet opening remains open and, in said downward position, said gate closes off said outlet opening; and,
   (d) a piston mechanism having a wide top, a piston rod and a piston head, said piston head being movably located within said chamber unit and having a cross-sectional area which is the same as the inside of said chamber unit, said piston rod running from said piston head through the opening in the top of said chamber unit top, said piston mechanism being capable of upward movement by material entering the chamber unit when a squeezable container is squeezed and material enters said chamber unit through said inlet opening, and capable of downward movement when its wide top is pushed downward, so as to dispense material through said sidewall outlet opening, said piston mechanism having its wide top extend downward on the outside of said chamber unit so as to contact said gate and move said gate from its upward position to its downward position when said wide top is pushed downward.

2. The metered side dispensing cap system of claim 1 wherein said sidewalls extend below said bottom with the attachment means attaching to the open neck of the squeezable container.

3. The metered side dispensing cap system of claim 2 wherein said attachment means is threading.

4. The metered side dispensing cap system of claim 2 wherein said gate is a collar which extends entirely around the outside of said chamber unit.

5. The metered side dispensing cap system of claim 1 wherein said gate is a wall section which is vertically movably mounted on said chamber unit.

6. The metered side dispensing cap system of claim 5 wherein said gate has a protrusion facing the outside of said chamber unit and said chamber unit has a corresponding indentation so that said protrusion and indentation nest when said gate is in its upward position and so that said protrusion and said outlet opening nest when said gate is in its downward position.

7. The metered side dispensing cap system of claim 5 wherein said gate includes a nozzle located so as to coincide with said outlet opening of said chamber wall with said gate in its upward position.

8. The metered side dispensing cap system of claim 1 wherein said gate is a collar which extends entirely around the outside of said chamber unit.

9. The metered side dispensing cap system of claim 8 wherein said gate includes a nozzle located so as to coincide with said outlet opening of said chamber wall with said gate in its upward position.

10. The metered side dispensing cap system of claim 1 wherein said gate includes a nozzle located so as to coincide with said outlet opening of said chamber wall with said gate in it upward position.

11. A metered side dispensing cap system for attaching to squeezable containers, which comprises:
    (a) a chamber unit having an inside and an outside, a bottom, sidewalls and a top and having an inlet opening in said bottom for flow of a material from a squeezable container into said chamber, having an outlet opening on a sidewall located near said bottom for dispensing material from the chamber in a metered amount, having an opening at said top for receiving a piston rod and having means for attachment of said chamber unit to an open neck of a squeezable container;
    (b) a one-way valve located in said inlet opening on the bottom of said chamber unit, permitting flow of material from a squeezable container through said opening and preventing backflow of material back into said container;
    (c) a gate located on the outside of said chamber unit near said outlet opening movably attached thereto so as to be movable vertically to an upward position and to a downward position whereby, in said upward position, said outlet opening remains open and, in said downward position, said gate closes off said outlet opening; and,
    (d) a piston mechanism having a wide top, a piston rod and a piston head, said piston head being movably located within said chamber unit and having a cross-sectional area which is the same as the inside of said chamber unit, said piston rod running from said piston head through the opening in the top of said chamber unit top, said piston mechanism being capable of upward movement by material entering the chamber unit when a squeezable container is squeezed and material enters said chamber unit through said inlet opening, and capable of downward movement when its wide top is pushed downward, so as to dispense material through said sidewall outlet opening, said piston mechanism having its wide top extend downward on the outside of said chamber unit so as to contact said gate and move said gate from its upward position to its downward position when said wide top is pushed downward; and,
    (e) at least two gripping extensions protruding outwardly from areas near the bottom of said system.

12. The metered side dispensing cap system of claim 11 wherein said sidewalls extend below said bottom with the attachment means attaching to the open neck of the squeezable container and said gripping extensions are located on said sidewalls.

13. The metered side dispensing cap system of claim 12 wherein said attachment means is threading.

14. The metered side dispensing cap system of claim 12 wherein said gate is a collar which extends entirely around the outside of said chamber unit.

15. The metered side dispensing cap system of claim 11 wherein said gate is a wall section which is vertically movably mounted on said chamber unit.

16. The metered side dispensing cap system of claim 15 wherein said gate has a protrusion facing the outside of said chamber unit and said chamber unit has a corresponding indentation so that said protrusion and indentation nest when said gate is in its upward position and so that said protrusion and said outlet opening nest when said gate is in its downward position.

17. The metered side dispensing cap system of claim 15 wherein said gate includes a nozzle located so as to coincide with said outlet opening of said chamber wall with said gate in its upward position.

18. The metered side dispensing cap system of claim 11 wherein said gate is a collar which extends entirely around the outside of said chamber unit.

19. The metered side dispensing cap system of claim 18 wherein said gate includes a nozzle located so as to coincide with said outlet opening of said chamber wall with said gate in its upward position.

20. The metered side dispensing cay system of claim 11 wherein said gate includes a nozzle located so as to coincide with said outlet opening of said chamber wall with said gate in its upward position.

* * * * *